(12) United States Patent
Fischer et al.

(10) Patent No.: US 6,482,376 B2
(45) Date of Patent: Nov. 19, 2002

(54) PROCESS FOR THE CATALYTIC REMOVAL OF POLYCYCLIC AROMATIC NITRO, NITROSO AND/OR AMINO COMPOUNDS

(75) Inventors: Walter Fischer, Kronach (DE); Ronald Neufert, Michelau (DE)

(73) Assignee: Siemens Aktiengesellschaft, Munich (DE)

(*) Notice: Subject to any disclaimer, the term of this patent is extended or adjusted under 35 U.S.C. 154(b) by 53 days.

(21) Appl. No.: 09/799,542

(22) Filed: Mar. 5, 2001

(65) Prior Publication Data

US 2001/0021364 A1 Sep. 13, 2001

Related U.S. Application Data

(63) Continuation of application No. PCT/DE99/02677, filed on Aug. 26, 1999.

(30) Foreign Application Priority Data

Sep. 4, 1998 (DE) .......................................... 198 40 404

(51) Int. Cl.[7] .................. C01G 30/00; B01J 8/00; C01B 21/22; C01B 31/20
(52) U.S. Cl. ................ 423/213.2; 423/239.1; 423/402; 423/437.1
(58) Field of Search .................... 423/213.2, 235, 423/236, 239.1, 402, 437.1

(56) References Cited

U.S. PATENT DOCUMENTS 4,587,116 A * 5/1986 Livingston et al. ......... 423/415
4,977,127 A * 12/1990 Rikimaru et al. ........... 502/309
5,628,186 A 5/1997 Schmelz ...................... 60/274
5,723,404 A 3/1998 Bütje et al. ................. 502/350
5,738,024 A * 4/1998 Winegar ..................... 110/345

FOREIGN PATENT DOCUMENTS

| DE | 1 043 7173 | 11/1958 |
| DE | 36 36 250 A1 | 4/1988 |
| DE | 196 35 893 A1 | 3/1998 |
| EP | 0 390 059 A2 | 10/1990 |
| EP | 0 487 886 A1 | 6/1992 |
| EP | 0 615 777 A1 | 9/1994 |
| EP | 0 472 014 A1 | 2/1999 |
| JP | 58174236 A * | 10/1983 ........... B01D/53/36 |
| WO | WO 91/09823 | 7/1991 |
| WO | WO 95/32789 | 12/1995 |

OTHER PUBLICATIONS

"New hazards in Diesel exhaust gas" ["Neue Gefahr im Dieselabgas"], VDI nachrichten, Technik & Wirtschaft, Nov. 7, 1997, Nr. 45, p. 33.

* cited by examiner

Primary Examiner—Stanley S. Silverman
(74) Attorney, Agent, or Firm—Laurence A. Greenberg; Werner H. Stemer; Gregory L. Mayback

(57) ABSTRACT

A process is provided for the catalytic removal of polycyclic aromatic nitro, nitroso and/or amino compounds from the exhaust gas of a combustion system, in particular a diesel engine. The exhaust gas is brought into contact with a catalytic converter which includes a catalytically active material that contains titanium dioxide, at a temperature of from 150 to 600° C. The polycyclic aromatic compounds are oxidized at the catalytic converter through the use of oxygen to form nitrogen oxides, carbon dioxide and water.

11 Claims, 1 Drawing Sheet

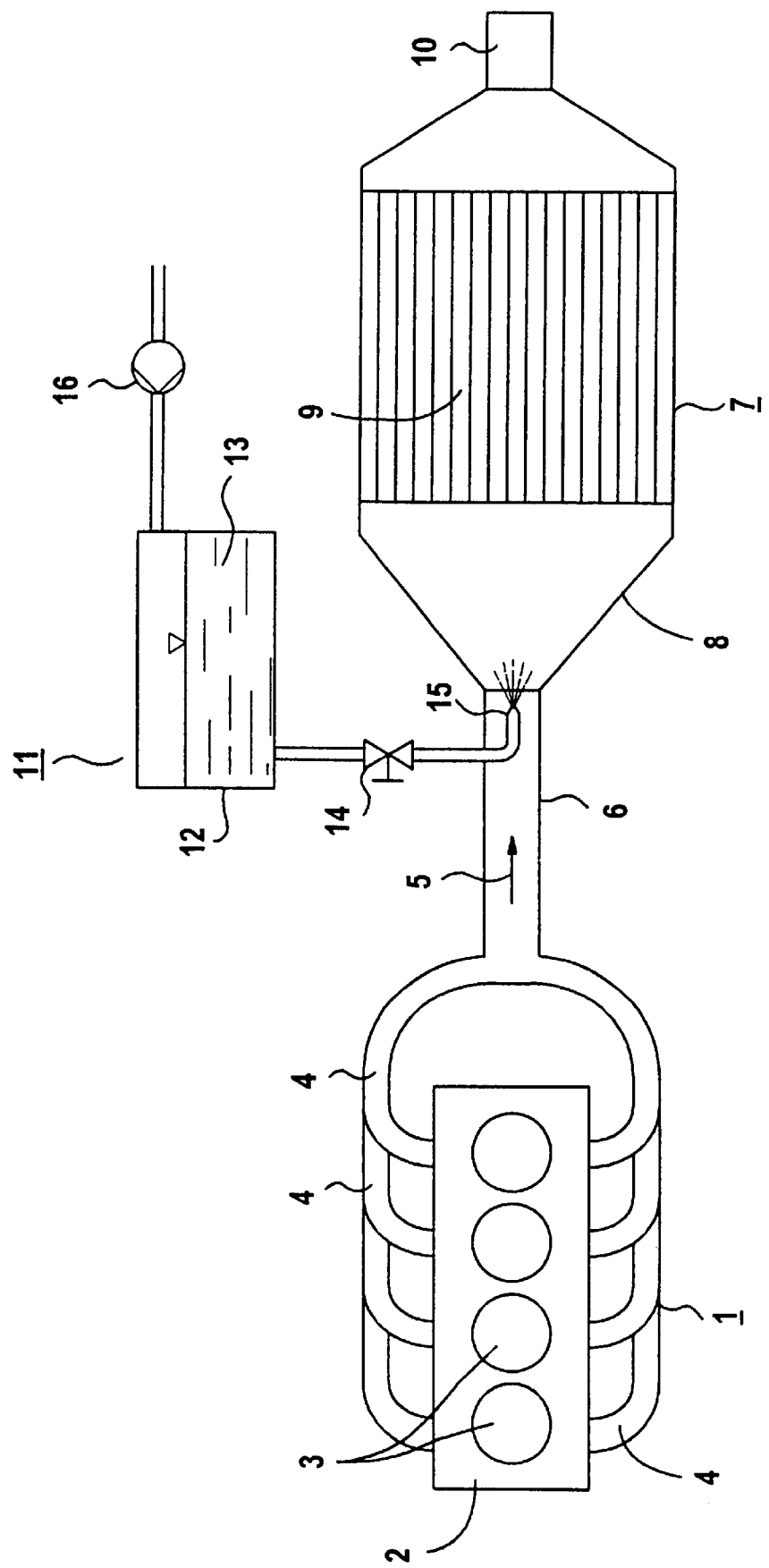

PROCESS FOR THE CATALYTIC REMOVAL OF POLYCYCLIC AROMATIC NITRO, NITROSO AND/OR AMINO COMPOUNDS

CROSS-REFERENCE TO RELATED APPLICATION

This application is a continuation of copending International Application No. PCT/DE99/02677, filed Aug. 26, 1999, which designated the United States.

BACKGROUND OF THE INVENTION

Field of the Invention

The invention relates to a process for the catalytic removal of polycyclic aromatic nitro, nitroso and/or amino compounds from an oxygen-containing exhaust gas of a combustion system, in particular a diesel engine.

It is known from the article "Neue Gefahr im Dieselabgas" [New danger in diesel exhaust gas] by Jens Simon, VDI-Nachrichten, Nov. 7, 1997, that compounds from the class of the nitrogenous, polycyclic aromatic hydrocarbons (nitro-PAHs) are contained particularly in the exhaust gas from a diesel engine. It is assumed that these nitro-PAHs are formed as a result of a reaction of the polycyclic aromatic hydrocarbons (PAHs) which accumulate on emitted soot particles as byproducts of the combustion of diesel with the nitrogen oxides contained in the exhaust gas. In particular, the presence of ozone appears to play an important role in this reaction. The higher the ozone level in the ambient air, the greater the level of nitro-PAHs in the exhaust gas from a diesel engine.

In the context of the present document, the term nitro-PAHs is to be understood as meaning polycyclic aromatic nitro and nitroso compounds, as well as polycyclic aromatic amino compounds.

The group of PAHs contained in the exhaust gas from a diesel engine includes, for example, benzpyrene, anthracene and naphthalene.

Various representatives of the group of the nitro-PAHs, in particular 3-nitrobenzanthrone and dinitropyrene, are highly toxic. For example, 3-nitrobenzanthrone is thought to be highly mutagenic and carcinogenic. Other representatives of the nitro-PAHs can also have a high toxicity.

Particularly in the case of a diesel engine for driving a passenger automobile or truck, not inconsiderable levels of nitro-PAHs are present whenever ozone is present close to the ground. In recent years, an increase in atmospheric pollution has led to increased formation of ozone in particular in the summer months.

SUMMARY OF THE INVENTION

It is accordingly an object of the invention to provide a process for catalytic removal of polycyclic aromatic nitro, nitroso and/or amino compounds (nitro-PAHs) from the exhaust gas of a combustion system, in particular a diesel engine, that overcomes the disadvantages and inefficiencies of prior art processes and devices of this general type, and allows the levels of nitro-PAHs contained in the exhaust gas to be reduced as simply and effectively as possible.

With the foregoing and other objects in view, there is provided, according to the invention, a process for the catalytic removal of polycyclic aromatic nitro, nitroso and/ or amino compounds from the exhaust gas of a combustion system, in particular a diesel engine, which comprises the steps of transporting a gas stream containing a polycyclic aromatic nitrogen compound into a reactor volume containing a catalyst body, and contacting the gas stream with a catalyst body including an active mass of titanium dioxide at a temperature in the range of 150° C. to 600° C., whereby the polycyclic aromatic nitrogen compound is oxidized to nitrogen oxides, carbon dioxide, and water. Sufficient oxygen to accomplish this oxidation is present in the exhaust gas but can be supplemented with external supply where needed.

Initial tests have shown that, by bringing an exhaust gas which contains nitro-PAHs into contact with the surface of a catalytic converter which contains titanium dioxide, the nitro-PAH compounds, in the presence of oxygen, are very successfully oxidized to form nitrogen oxides, carbon dioxide and water. The catalytic converter containing titanium dioxide has hitherto been known as a so-called deNOx catalytic converter for reducing the levels of nitrogen oxides in the exhaust gas of a combustion system using the selective catalytic reduction process in the presence of oxygen and a reducing agent.

The catalytically active material advantageously contains 80 to 95% by weight titanium dioxide, 2–10% by weight tungsten trioxide and/or molybdenum trioxide, and 0.05 to 5% by weight vanadium pentoxide.

In order to oxidize the nitro-PAHs, a certain oxygen content is required in the exhaust gas. Particularly in the case of a diesel engine, the exhaust gas inherently has a relatively high residual oxygen content, so that by bringing the exhaust gas into contact with the catalytic converter, the levels of nitro-PAHs contained therein are effectively reduced. However, it also possible for oxygen to be separately admixed to the exhaust gas.

The catalytic converter can be constructed as a honeycomb body or as a plate-type catalytic converter. However, the catalytic converter can also be used as bulk material or in the form of pellets. Inorganic fibers and/or silicates can be added to the catalytically active material as filler and support matrix.

In an advantageous configuration of the invention, a nitrogen-containing reducing agent is added to the exhaust gas before it is brought into contact with the catalytic converter, which reducing agent, at the catalytic converter, in the presence of oxygen reduces nitrogen oxides contained in the exhaust gas. In this way, first the formation of the nitro-PAHs from PAHs and nitrogen oxides contained in the exhaust gas is suppressed. Secondly, in this way the catalytic converter is utilized as a deNOx catalytic converter for the removal of nitrogen oxides using the SCR process. Accordingly, the use of a reducing agent has a double benefit. Also, nitro-PAHs are converted at the catalytic converter, together with oxygen and the nitrogen-containing reducing agent, to form nonhazardous compounds. This is an additional reaction pathway in addition to the oxidation of the nitro-PAHs with oxygen to form carbon dioxide and water.

An example of a suitable nitrogen-containing reducing agent is ammonia or a compound which releases ammonia. Advantageously, urea is added as a compound which releases ammonia and from which ammonia is formed in the exhaust gas at a suitable temperature within the effective range by pyrolysis and/or hydrolysis in the water-containing exhaust gas.

The invention offers the advantage that, because of the use of a catalytic converter, the formation of nitro-PAHs from PAHs is prevented and, at the same time, the nitro-PAHs are broken down to form nonhazardous compounds. In principle, the invention can be used to reduce the levels of the highly dangerous nitro-PAHs in an exhaust gas from a combustion system if this exhaust gas contains oxygen. Otherwise, oxygen is supplied to the exhaust gas separately.

Other features which are considered as characteristic for the invention are set forth in the appended claims.

Although the invention is illustrated and described herein as embodied in a process for the catalytic removal of polycyclic aromatic nitro, nitroso and/or amino compounds, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a diagrammatic, elevational view of a diesel engine with an exhaust pipe and a reactor which is connected to the exhaust pipe for the catalytic removal of nitro-PAHs contained in the exhaust gas.

DESCRIPTION OF THE PREFERRED EMBODIMENTS

Referring now in detail to the single FIGURE of the drawing, there is seen a diagrammatic illustration of a diesel engine 1 with an engine block 2 and cylinders 3 disposed therein. The exhaust gas 5 formed is discharged through the exhaust tubes 4 and is collected in a common exhaust pipe 6 through the use of a manifold. A reactor 7 having a housing 8 and a catalytic converter 9 disposed in the housing is connected to the exhaust pipe 6. The catalytic converter is configured as an unsupported extrudate in honeycomb form, with a number of flow passages which are disposed parallel to one another and through which the exhaust gas can flow.

The exhaust gas 5 flows through the exhaust pipe 5 into the widened housing 8 of the reactor 7 and then flows through the catalytic converter 9. At the entrance to the catalytic converter 9, the temperature of the exhaust gas is still approximately 200 to 300° C. Nitro-PAHs contained in the exhaust gas are converted to nonhazardous compounds at the catalytic converter 9 using residual oxygen which is present in the exhaust gas 6 from the diesel engine 1. The cleaned exhaust gas 6, from which nitro-PAHs have been removed, is ultimately discharged to the atmosphere through the exhaust 10.

In addition, a device 11 for introducing reducing agent is connected to the exhaust pipe 6. This device has a storage tank 12 for a liquid reducing agent 13. The reducing agent 13 used is an aqueous urea solution. Via a controllable valve 14, an appropriate quantity of the reducing agent 13 is sprayed into the exhaust gas 6 through the use of an injection nozzle 15, as a function of parameters which characterize the operating state of the diesel engine 1. Although not shown herein, the injection nozzle 15 is configured as a 2-fluid nozzle. A compressor 16 which supplies the storage vessel 12 with compressed air provides the excess pressure required for the spraying operation. The quantity of reducing agent which is to be metered into the exhaust gas 5 per unit time is set to a precalculated level of nitrogen oxides in the exhaust gas 5 through the use of the parameters which characterize the operating state of the diesel engine 1, such as speed, torque or fuel consumption.

As a result of pyrolysis and/or hydrolysis, the urea which is introduced breaks down into the actual reducing agent ammonia, which at the catalytic converter 9 reacts, in the presence of oxygen, with the nitrogen oxides contained in the exhaust gas 5 to form molecular nitrogen and water. At the same time, ammonia upstream of the catalytic converter 9 prevents the formation of nitro-PAHs from the PAHs contained in the exhaust gas. Furthermore, at the catalytic converter 9 ammonia additionally reacts with residual oxygen and nitro-PAHs which have already formed, to form nonhazardous compounds. In this way, levels of nitro-PAHs contained in the exhaust gas are effectively reduced. The level of nitro-PAHs in the exhaust gas 6 which passes into the atmosphere through the exhaust 10 lies below the detection limit.

We claim:

1. A process for the catalytic removal of at least one of polycyclic aromatic nitro, nitroso and amino compounds from an exhaust gas (5) of a combustion system, which comprises:

bringing an exhaust gas (5) of a combustion system into contact with a catalytic converter (9) including a catalytically active material containing titanium dioxide, at a temperature of from 150 to 600° C. wherein said exhaust gas (5) contains at least one member selected from the group consisting of polycyclic aromatic nitro, nitroso and amino compounds; and oxidizing at least one member selected from the group consisting of polycyclic aromatic nitro, nitroso and amino compounds with oxygen to form nitrogen oxides, carbon dioxide and water.

2. The process according to claim 1, which further comprises providing a diesel engine (1) as the combustion system.

3. The process according to claim 1, which further comprises providing the catalytically active material with 80 to 95% by weight of titanium dioxide, 2–10% by weight of at least one of tungsten trioxide and molybdenum trioxide, and 0.05 to 5% by weight of vanadium pentoxide.

4. The process according to claim 1, which further comprises adding a nitrogen-containing reducing agent (13) to the exhaust gas (5) before bringing the exhaust gas (5) into contact with the catalytic converter (9), and reducing nitrogen oxides contained in the exhaust gas (5) with the reducing agent in the presence of oxygen, at the catalytic converter (9).

5. The process according to claim 4, which further comprises adding urea as the reducing agent (13), and forming ammonia in the exhaust gas (5) from the urea through at least one of pyrolysis and hydrolysis.

6. A process for the catalytic removal of a polycyclic aromatic nitrogen compound from a gas stream, which comprises the steps of:

transporting a gas stream containing a polycyclic aromatic nitrogen compound into a reactor volume containing a catalyst body including an active mass of titanium dioxide; and bringing the gas stream into contact with the catalyst body at a temperature in a range of 150° C. to 600° C., for oxidizing the polycyclic aromatic nitrogen compound into nitrogen oxide, carbon dioxide and water.

7. The process according to claim 6, wherein the gas stream is exhaust gas from a diesel engine.

8. The process according to claim 6, which further comprises selecting the polycyclic aromatic nitrogen compound from the group consisting of polycyclic aromatic nitro compounds, polycyclic aromatic nitroso compounds, and polycyclic aromatic amines.

9. The process according to claim 6, wherein the active mass includes 80–95% by weight of titanium dioxide, 2–10% by weight of at least one of tungsten trioxide and molybdenum trioxide, and 0.05–5% by weight of vanadium pentoxide.

10. The process according to claim 6, which further comprises admixing a nitrogenous reducing agent with the exhaust gas prior to contacting the catalyst body, for catalytically reducing nitrogen oxides in the presence of oxygen.

11. The process according to claim 10, which further comprises selecting urea as the nitrogenous reducing agent.

* * * * *